United States Patent
Hammond-Smith et al.

(10) Patent No.: US 7,495,740 B2
(45) Date of Patent: Feb. 24, 2009

(54) BIREFRINGENT MARKING

(75) Inventors: Robert Hammond-Smith, Hampshire (GB); John Patrick, Dorset (GB); Rodney Riddle, Dorset (GB); Matthias Kuntz, Seeheim-Jugenheim (DE); Michael Ukelis, Riedstadt (DE); Peter Schmitt, Wuerzburg (DE); Siegfried Schmitzer, Kuernach (DE)

(73) Assignee: Merck Patent GmbH, Darmstadt (DE)

( * ) Notice: Subject to any disclaimer, the term of this patent is extended or adjusted under 35 U.S.C. 154(b) by 280 days.

(21) Appl. No.: 10/527,693

(22) PCT Filed: Aug. 8, 2003

(86) PCT No.: PCT/EP03/08808

§ 371 (c)(1),
(2), (4) Date: Mar. 11, 2005

(87) PCT Pub. No.: WO2004/025337

PCT Pub. Date: Mar. 25, 2004

(65) Prior Publication Data

US 2006/0023157 A1 Feb. 2, 2006

(30) Foreign Application Priority Data

Sep. 11, 2002 (EP) ................. 02020293

(51) Int. Cl.
  *G02F 1/13* (2006.01)
(52) U.S. Cl. ...................................... 349/187
(58) Field of Classification Search ............... 349/187
  See application file for complete search history.

(56) References Cited

U.S. PATENT DOCUMENTS

| 4,514,085 A * | 4/1985 | Kaye .......................... 356/71 |
| 6,806,930 B2 * | 10/2004 | Moia .......................... 349/117 |
| 2003/0035191 A1 | 2/2003 | Moia |
| 2003/0178609 A1 | 9/2003 | Hammond-Smith et al. |

FOREIGN PATENT DOCUMENTS

| EP | 1120737 | 8/2001 |
| EP | 1335217 | 8/2003 |
| GB | 2357061 | 6/2001 |
| WO | WO 02085642 | 10/2002 |

* cited by examiner

*Primary Examiner*—James A Dudek
(74) *Attorney, Agent, or Firm*—Millen, White, Zelano & Branigan, P.C.

(57) ABSTRACT

The invention relates to a method of preparing a birefringent marking by printing a polymerisable liquid crystal material onto at least one side of a substrate and polymerising the liquid crystal material, to a birefringent marking obtained by this method, and to the use of the birefringent marking for decorative, security, authentification and identification applications.

33 Claims, No Drawings

BIREFRINGENT MARKING

FIELD OF THE INVENTION

The invention relates to a method of preparing a birefringent marking comprising polymerised liquid crystal material by applying a polymerisable liquid crystal material onto at least one side of a substrate using printing techniques and polymerising the liquid crystal material. The invention further relates to a birefringent marking obtained by this method, and to the use of the birefringent marking for decorative, security, authentification or identification applications. Furthermore, the invention relates to a security, authentification or identification marking, thread or device, to a document of value, to a hot stamping foil, to a reflective foil and to an optical data storage device comprising the birefringent marking according to the invention.

BACKGROUND AND PRIOR ART

Birefringent films comprising polymer liquid crystal material are known in prior art. GB 2 324 382 discloses a liquid crystal polymer film with homeotropic alignment prepared from a polymerisable liquid crystal material that is coated onto a plastic substrate and polymerised, whereby roll to roll coating is applicable. The use of an aligning layer comprising a surfactant being fixed in a matrix of a polymeric liquid crystalline material is also described. According to an alternative embodiment the substrate is coated with aluminium or sufficiently smooth $Al_2O_3$ to achieve a homeotropic alignment of the liquid crystal material. The resulting uniformly homeotropic aligned films can be used in electrooptical displays, optical compensation layers or as active switching layer.

The use of birefringent films as security devices has also been reported in prior art.

GB 2 330 360 describes a polymer film with a helically twisted molecular structure exhibiting at least two maxima of a reflection wavelength. The film is obtained by polymerizing a thermochromic mesogenic composition at varied temperatures. Since the temperature is changed during polymerization, the thermochromic polymerizable composition undergoes a change of the helical pitch and therewith of the reflection maximum. The various pitch lengths are fixed by the polymerization reaction and a polymer film is obtained that exhibits, depending on the type, degree and speed of temperature variation, a range of reflection colours.

However, a disadvantage of the method described in GB 2 330 360 is the requirement of a precise control of the temperature and its change during the polymerization process, and the need of specific materials with thermochromic properties.

GB 2 357 061 discloses a hot stamping foil for security applications comprising a layer of polymerised liquid crystal material. The liquid crystal polymer layer is prepared on a plastic substrate and then laminated with a reflective layer of e.g. aluminium which exhibits on its opposite surface a hot melt adhesive. The liquid crystal layer is protected by a lacquer. The whole arrangement of layers is carried by a support layer. A wax layer between the support layer and the lacquer layer enables a release of the birefringent layer arrangement by applying heat. The liquid crystal material is for example a polymerised or crosslinked nematic or smectic material with a planar, tilted, splayed or homeotropic structure and macroscopically uniform orientation. The hot stamping foil can be used for decorative purposes or to authenticate and prevent counterfeiting of documents of value, e.g. of banknotes, credit cards or ID cards. The transmission or reflection effect of the polarized light by the birefringent material can be seen using linear polarizers. Incorporation of dichroic dyes leads to additional color effects.

However, the process described in GB 2 357 061 requires the additional process step of transferring or laminating the polymeric liquid crystalline material, which is typically prepared on a plastic substrate, to the reflective aluminium layer, or alternatively applying the aluminium layer onto the liquid crystal layer. This is required since the natural alignment of nematic liquid crystals on aluminium surfaces is homeotropic. However, this alignment would not be useful for displaying hidden designs. Also, the preparation of a liquid crystal polymer layer by coating a polymerisable material onto a substrate usually yields uniform coated areas of the material. The formation of images or patterns would require specific materials or additional techniques such as photomasking or photoorientation.

AIMS OF THE INVENTION

The aim of the present invention is to provide a birefringent marking, in particular for decorative, security, authentification or identification applications, that does not have the drawbacks of the prior art devices, exhibits effects difficult to counterfeit and allows an economic fabrication even at large scales.

A further aim of this invention relates to a method of preparing a birefringent marking according to this invention, which allows a fast, reliable and cheap fabrication.

A further aim of this invention is to provide an advantageous use of the birefringent marking according to this invention.

Further aims of this invention relate to security, authentification or identification markings or devices, to a reflective film and to an optical data storage device, which are difficult to counterfeit.

Other aims of the present invention are immediately evident to the person skilled in the art from the following detailed description.

The inventors have found that the above aims can be achieved by providing a birefringent marking comprising polymerised liquid crystal material obtained by a method according to the present invention. In said method a polymerisable liquid crystal material is applied onto a substrate and polymerised, wherein the substrate is a reflective substrate and the polymerisable liquid crystal material is applied by using printing techniques. A birefringent marking prepared by said method shows particularly striking visual effects.

SUMMARY OF THE INVENTION

The invention relates to a method of preparing a birefringent marking comprising polymerised liquid crystal material by printing a polymerisable liquid crystal material onto at least one surface of a reflective substrate and polymerising the liquid crystal material.

The present invention further relates to a birefringent marking obtainable by a method according to the present invention.

The invention further relates to the use of a birefringent marking according to the present invention in decorative, security, authentification or identification applications.

The invention further relates to a security, authentification or identification marking, thread or device comprising at least one birefringent marking according to the present invention.

The invention further relates to a document of value, hot stamping foil, reflective foil or optical data storage device comprising at least one birefringent marking or at least one security, authentification or identification marking, thread or device according to the present invention.

DEFINITION OF TERMS

In connection with liquid crystal layers and films as described in the present application, the following definitions of terms as used throughout this application are given.

The term 'film' as used in this application includes self-supporting, i.e. free-standing, films or foils that show more or less pronounced mechanical stability and flexibility, as well as precoated, preprinted or laminated foils whereas the coating or printing can be partially or completely, as well as coatings or layers on a supporting substrate or between two or more substrates.

The term 'marking' includes films or coatings or layers covering the entire area of a substrate, as well as markings covering discrete regions of a substrate for example in the shape of a regular pattern or image.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. Liquid crystal compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerized.

For the sake of simplicity, the term 'liquid crystal material' is used hereinafter for both liquid crystal materials and mesogenic materials, and the term 'mesogen' is used for the mesogenic groups of the material.

The term 'non-chiral' material includes materials that consist exclusively of achiral compounds, as well as materials that consist of or comprise a racemate.

The director means the preferred orientation direction of the long molecular axes (in case of calamitic compounds) or short molecular axis (in case of discoic compounds) of the mesogens in a liquid crystal material.

The term 'planar structure', 'planar alignment' or 'planar orientation' refers to a layer or film of liquid crystal material wherein the director is substantially parallel to the plane of the film or layer.

The term 'homeotropic structure', 'homeotropic alignment' or 'homeotropic orientation' refers to a layer or film of liquid crystal material wherein the director is substantially perpendicular to the film plane, i.e. substantially parallel to the film normal.

The term 'tilted structure', 'tilted alignment' or 'tilted orientation' refers to a layer or film of liquid crystal material wherein the director is tilted at an angle $\theta$ of between 0 and 90 degrees relative to the film plane.

The term 'splayed structure', 'splayed alignment' or 'splayed orientation' means a tilted orientation as defined above, wherein the tilt angle varies monotonuously in the range from 0 to 90°, preferably from a minimum to a maximum value, in a direction perpendicular to the film plane.

For sake of simplicity, a film comprising liquid crystal material with a planar, homeotropic, tilted or splayed orientation, alignment or structure is hereinafter also referred to as 'planar film', 'homeotropic film', 'tilted film' and 'splayed film', respectively.

The term "reflectve substrate" covers substrates with mirrorlike surfaces for printing onto metal films, substrates showing Lambertian reflection which are especially suitable when printing onto e.g. pearlescent pigment systems, and substrates that comprise or are part of an optically variable device (OVD), like for example a diffraction grating, hologram or kinegram. "Reflection" means reflection of light inside the visible range of the spectrum (with wavelengths from approximately 400 to 800 nm) and outside the visible range, e.g. in the UV or IR range (i.e. with wavelengths of less than 400 nm or more than 800 nm).

DETAILED DESCRIPTION OF THE INVENTION

Preferred embodiments of the invention relate to a method or birefringent marking wherein
  the liquid crystal material is a non-chiral material,
  the liquid crystal material does not comprise chiral compounds,
  the liquid crystal material comprises a racemate,
  the liquid crystal material does not have a helically twisted structure,
  the liquid crystal material does not show selective reflection of wavelengths in or below the IR range,
  the polymerisable liquid crystal material is a nematic or smectic liquid crystal material,
  the reflective substrate comprises at least one metallic or metallised layer, wherein the metal is preferably selected from aluminium, gold and copper, very preferably aluminium,
  the reflective substrate is a metallic film, a metallised paper or polymer film, a hot stamping foil or a holographic image,
  the reflective substrate comprises at least one layer of reflective pigments, preferably selected from interference or pearlescent pigments or liquid crystal pigments.
  the reflective substrate comprises at least one layer of dielectric coating for reflection of a specific range of electromagnetic spectra.
  the reflective substrate is a holographic optical element (HOE) for reflection of a specific range of electromagnetic spectra.
  the reflective substrate is a hologram optimized for reflection of a specific range of electromagnetic spectra or a rainbow hologram.
  the liquid crystal material comprises at least one compound which induces and/or enhances a planar alignment,
  the compound inducing and/or enhancing a planar alignment is a surfactant, preferably a nonionic surfactant, the polymerised liquid crystal material has a planar structure,
  the polymerised liquid crystal material has a splayed structure.

The reflective substrate can be a substrate showing specular or Bragg reflection or an OVD (optically variable device) layer or a part of an OVD layer. Preferred reflective substrates are metallic or metallised substrates, i.e. substrates incorporating or being covered by one or more metal layers. In addition these substrates may also be part of an OVD, like a hot stamping foil or a holographic image. Further preferred are substrates incorporating or being covered by one or more layers of reflective pigments, like metal flakes, pearlescent or interference pigments or liquid crystal pigments, or mixtures thereof.

Metal substrates or metallised layers can be selected e.g of Al, Cu, Ni, Ag, Cr or alloys like e.g. Pt—Rh or Ni—Cr, or layers comprising one or more metal flakes dispersed in a light transmissive binder. Suitable metal flakes are e.g. flakes aluminium, gold or titan, or metal oxide flakes of e.g. $Fe_2O_3$ and/or $TiO_2$.

Suitable pearlescent or interference pigments are e.g. mica, $SiO_2$, $Al_2O_3$, $TiO_2$ or glass flakes that are coated with one or more layers of e.g. titanium dioxide, iron oxide, titanium iron oxide or chrome oxide or combinations thereof, flakes comprising combinations of metal and metal oxide, metal flakes of e.g. aluminium coated with layers of iron oxide layers and/or silicium dioxide. These pigments are known to the expert and are commercially available in a wide variety. Preferred pigments are for example the commercially available Iriodin®, Colourstream® or Xirallic® (from Merck KGaA, Darmstadt, Germany), or Paliochrome® (from BASF AG, Ludwigshafen, Germany), or optically variable pigments e.g. from Flex Corp.

It is also possible to use liquid crystal pigments or coatings comprising a polymerized or crosslinked cholesteric liquid crystal material, e.g. cholesteric liquid crystal pigments dispersed in a transparent binder. Suitable liquid crystal pigments and binder systems are known to the expert and are described for example in U.S. Pat. Nos. 5,364,557, 5,834,072, EP 0 601 483, WO 94/22976, WO 97/27251, WO 97/27252, WO 97/30136 or WO 99/02340.

Preferably the substrate comprises a surface of metal, in particular of aluminium, at the substrate—liquid crystal layer interface.

Further preferred are substrates covered by one or more layers of pearlescent or intereference pigments or liquid crystal pigments, or mixtures thereof, which are dispersed in a transparent binder.

Suitable substrates include films, paper, board, leather, cellulose sheeting, textiles, plastics, glass, ceramics and metals. Suitable polymer films are for example polyester such as polyethyleneterephthalate (PET) or polyethylenenaphthalate (PEN), polyvinylalcohol (PVA), polycarbonate (PC) or triacetylcellulose (TAC), especially preferably PET or TAC. Especially preferred are substrates metallised with aluminium, or aluminium foils.

The substrate or at least the surface of the substrate printed with the liquid crystal material is preferably flat, like e.g. a foil, film or sheet, and has preferably a thickness smaller than 200 μm, in particular smaller than 60 μm, most preferably smaller than 20 μm.

The substrate surface is preferably planar, but may also be structured, patterned and/or have a relief. The shape, structure, pattern and/or relief of the substrate is preferably adapted to the desired application of the inventive birefringent marking. Suitable structuring and patterning techniques are well known to the one skilled in the art, in particular in the fields of precision engineering and microtechnology, and include but are not limited to lithography, etching, cutting, stamping, punching, embossing, molding and electron discharge machining techniques.

It is also possible to use a reflective substrate comprising or being part of an OVD, like a diffraction grating, hologram, kinegram or common holographic optical element (HOE), a holographic layer with an embossed, patterned or structured surface, or a layer of reflective holographic pigments. Light reflected by higher regions of the structured surface will interfer with light reflected by lower regions of the structured surface, thereby forming a holographic image. The preparation of holographic layers is described for example in U.S. Pat. No. 4,588,664, the entire disclosure of which is incorporated into this application by reference.

Thus, for example a substrate like e.g. a banknote, or selected regions thereof, can have applied to it a hologram or reflective metal layer, onto which the liquid crystal material is printed. Alternatively the marking may be prepared separately on a reflective substrate which is then applied to the document of value for example as security thread or as another form of a security marking.

This embodiment is particularly suitable for use as false-proof security threads or holograms on banknotes or documents of value, providing a security marking by which the banknote is easy to authenticate when viewed through a polariser.

The liquid crystal material may be applied onto one side or on both sides of the reflective substrate. It may be printed onto discrete regions of the substrate to form a pattern or image that is for example visible under unpolarised light due to a change in the surface gloss in the printed areas, or may be invisible under unpolarised light and become visible only when viewed through a polariser. Alternatively the liquid crystal material may be printed onto the entire substrate to form a continuous layer or film that becomes visible only when viewed through a polariser.

Preferably the birefringent marking is prepared by printing a mixture comprising the liquid crystal material and a solvent onto the reflective substrate and allowing the solvent to evaporate before or during polymerisation. The mixture can be a solution, dispersion or emulsion of the liquid crystal material in the solvent. Preferably a solution is used. The solvent may evaporate with or without the use of external forces such as heat or reduced pressure.

The liquid crystal material can be printed onto the substate by conventional printing techniques which are known to the expert, including for example screen printing, offset printing, dry offset printing reel-to-reel printing, letter press printing, gravure printing, rotogravure printing, flexographic printing, intaglio printing, pad printing, heat-seal printing, ink-jet printing, thermal transfer printing or printing by means of a stamp or printing plate. The printing process induces or enhances spontaneous alignment of the liquid crystal material on the substrate.

The liquid crystal material may additionally comprise a polymeric binder or one or more monomers capable of forming a polymeric binder and/or one or more dispersion auxiliaries. Suitable binders and dispersion auxiliaries are disclosed for example in WO 96/02597.

Especially preferred are liquid crystal materials not containing a binder or dispersion auxiliary.

In a preferred embodiment the liquid crystal material comprises an additive that induces or enhances planar alignment of the liquid crystal material on the substrate. Preferably the additive comprises one or more surfactants. Suitable surfactants are described for example in J. Cognard, Mol. Cryst. Liq. Cryst. 78, Supplement 1, 1-77 (1981). Particularly preferred are non-ionic surfactants, very, fluorocarbon surfactants, like for example the commercially available fluorocarbon surfactants Fluorad FC-171® (from 3M Co.), or Zonyl FSN® (from DuPont).

Suitable and preferred fluorocarbons surfactant are for example those of formula I $$C_nF_{2n+1}SO_2N(C_2H_5)(CH_2CH_2O)_xCH_3 \qquad I$$

wherein n is an integer from 4 to 12 and x is an integer from 5 to 15, which are commercially available as Fluorad FC-171® (from 3M Co.).

The lower limit of the amount of the additives inducing planar alignment in the polymerisable liquid crystal material is preferably 0.01 weight %, in particular 0.05 weight %, most preferably 0.1 weight % of the liquid crystal material. The upper limit of the amount of said compounds is preferably 5 weight %, in particular 3 weight %, most preferably 1.5 weight % of the liquid crystal material.

The optimum range of the thickness of the birefringent marking depends upon the strength of the birefringence of the liquid crystal material. The person skilled in the art can determine easily the optimum range of the thickness. Birefringent markings with a birefringence in the range from 0.1 to 0.3 generally have a preferred thickness from 0.5 to 20 µm, especially 0.7 to 10 µm, most preferably 1 to 6 µm.

The thickness of the marking can be altered for example by changing the solvent concentration of the liquid crystal mixture. The thickness of the final liquid crystal layer thus increases with increasing amount of liquid crystal material in the mixture. Furthermore a wetting agent or a surfactant may be added to the liquid crystal solution to change its surface tension and its adhesion to the substrate. Such a wetting agent or surfactant may be the same surfactant or be added to the surfactant which is used to induce a planar alignment as described above. Suitable surfactants are those mentioned above.

The birefringent marking according to this invention may comprise one or more further layers, which are preferably applied onto the birefringent layer.

The further layers may be chosen according to the desired application of the birefringent film and may have a function, like e.g. as a protecting layer, support layer, adhesive layer, reflecting layer, optical retardation layer, colour filter and/or as a polariser.

For example, a preferred marking according to the invention comprises a circular or linear polariser applied on top of the liquid crystal layer. Thereby the marking becomes permanently visible and can be used e.g. as visible verification or copy-protection marking on an article or a document of value.

Suitable linear polarisers are known in the art. For example conventional linear absorption polarisers can be used, which typically comprise an uniaxially stretched polymer film of e.g. polyvinyl alcohol, or a polymer film into which a dichroic dye is incorporated. It is also possible to use a linear polariser comprising a layer of vitrified, polymerised or crosslinked liquid crystal (LC) material with planar structure, as described for example in EP-A-0 397 263, the entire disclosure of which is incorporated into this application by way of reference.

Suitable circular polarisers are also known in the art. For example a combination of a conventional linear polariser and a quarter wave retardation film (QWF) can be used. Alternatively it is possible to use a circular polariser comprising a layer of vitrified, polymerised or crosslinked cholesteric liquid crystal (LC) material with planar structure, which can operate as reflective polariser or colour filter in a narrow wavelength band (notch polariser), or in a broad wavelength band, as described for example in EP 0 606 940, WO 97/35219, EP 0 982 605 and WO 99/02340, the entire disclosure of which is incorporated into this application by reference.

Another preferred marking according to the invention comprises one or more optical retardation layer phase causing an optical phase shift of the light transmitted by the liquid crystal material and reflected by the reflective substrate. This leads to an additional colour shift of the birefringent marking when viewed through a polariser. Preferably, the retardation layer is a quarter wave film or foil (QWF) exhibiting a net retardation that is approximately 0.25 times the wavelength transmitted by the circular polarising layer.

Suitable retardation layers are known in the art and typically comprise uniaxially or biaxially stretched or compressed films of an isotropic polymer, like e.g. polyethylene terephthalate (PET), polyvinyl alcohol (PVA), polycarbonate (PC) or di- or triacetyl cellulose (DAC, TAC). It is also possible to use a phase shift layer or retardation film comprising a layer of vitrified, polymerised or crosslinked liquid crystalline material with planar structure, as described for example in WO 98/04651, or comprising a layer of vitrified, polymerised or crosslinked liquid crystalline material with tilted or splayed structure, as described for example in WO 98/12584, the entire disclosure of which is incorporated into this application by way of reference.

According to a first preferred embodiment of the invention, a nematic or smectic, preferably a nematic polymerisable liquid crystal material, comprising a surfactant is printed onto discrete regions of a metallised or metal substrate and the material in the printed regions is polymerised in-situ.

When viewing this marking under unpolarised light no colour effect is seen. The liquid crystal material is transparent and visible to the naked eye only at shorter distances due to the change of surface gloss in the printed regions. By covering the printed regions of the substrate, or the entire substrate including the printed and the non-printed regions, with a transparent lacquer, the change of surface gloss between the printed and non-printed regions can be prevented and the marking can be made completely invisible when viewed under unpolarised light. In case the marking is still visible under a specific viewing angle by its different thickness, this can be overcome by applying the negative marking with an ink containing no LC material. A later varnishing of the complete surface can enhance this camouflage.

When viewing this marking through a linear polariser against the reflective background a colour can be seen in the printed regions at specific angle intervals as the polariser is rotated. The strength of the colour can be influenced by varying the type of the reflective substrate.

When viewing the marking through a circular polariser the printed regions are visible against a darker background.

According to a second preferred embodiment of the invention, a nematic or smectic, preferably a nematic polymerisable liquid crystal material, comprising a surfactant is printed onto discrete regions of the surface of e.g. a paper substrate that is covered by a layer of interference pigments dispersed in a transparent binder, and the liquid crystal material in the printed regions is polymerised in-situ.

When viewing this marking under unpolarised light no colour effect is seen. The liquid crystal material is transparent and visible to the naked eye only at shorter distances due to the change of surface gloss in the printed areas. By covering the printed regions of the substrate, or the entire substrate including the printed and the non-printed regions, with a transparent lacquer, the change of surface gloss between the printed and non-printed regions can be prevented and the marking can be made completely invisible when viewed under unpolarised light.

When viewing this marking through a linear polariser against the reflective background the following effect is observed. The printed regions appear as slightly darker areas against a lighter background. In cases where the alignment of the liquid crystal material is planar then the printed areas will become darker, at specific angles of the polariser, as the polariser is rotated.

When viewing the marking through a circular polariser the printed regions appear visible against a darker background. This effect is independent of the orientation of the circular polariser.

The above effects cannot be achieved with standard security markings. Thus the birefringent marking according to the invention is especially suited for security, authentification or identification markings that cannot be counterfeited or copied easily, but also for decorative purposes. Furthermore, the birefringent marking can be fabricated economically even at large scales using printing processes. The method according to the present invention allows a fast, reliable and cheap fabrication of the inventive birefringent marking.

According to another preferred embodiment of the invention, the inventive birefringent film is part of a hot stamping foil. Thus a hot stamping foil comprising the inventive birefringent film is also an object of this invention. Preferred structures and the assembly of hot stamping foils are described in the GB 2 357 061, which is incorporated herein by reference in its entirety. The reflective substrate of the birefringent film according to the preferred embodiment of this invention corresponds to the reflective layer described in the GB 2 357 061, onto which the layer of liquid crystalline material is printed.

According to another preferred embodiment of the invention, the inventive birefringent marking is part of an optical data storage device. Thus an optical data storage device comprising the inventive birefringent film is also an object of this invention. As the inventive birefringent film does not affect the optical function, it is especially suited to mark such devices, in particular compact discs (CD), which may be read and/or write memory devices for data, like software, audio and/or video data.

In general such compact discs comprise a disc, being made of a transparent plastic material, like polycarbonate. One side of the plastic contains the data in digitized form (data pits) and is metallised, e.g. by a thin aluminium coating, which acts as a reflective surface for the laserbeam and is usually sputtered directly on top of the data pits. On top of the aluminum layer a protective varnish is spin-coated. On top of the protective varnish a printed image can be applied. The reading of the data is done through the transparent plastic material. According to one variant of this embodiment, the inventive birefringent marking can be directly printed onto the protective varnish, which serves as a substrate. The birefringent marking may cover one side of the disc completely or only one or more parts of it. When viewing from the printed side of the disc through a linear polarizer one can see the non-regular pattern as described.

The LC material of the birefringent layer is preferably a nematic or smectic LC material. Nematic LC materials are especially preferred.

Preferably the liquid crystal material is a polymerisable or crosslinkable material, preferably dissolved in an organic solvent, which is polymerised or crosslinked by in-situ polymerisation during or after evaporation of the solvent.

The polymerisable liquid crystal material preferably comprises at least one monoreactive achiral polymerisable mesogenic compound and at least one di- or multireactive achiral polymerisable mesogenic compound.

If di- or multireactive compounds are present in the polymerisable material, a three-dimensional polymer network is formed and the planar orientation of the LC material is permanently fixed. An polymer film made of such a network is self-supporting and shows a high mechanical and thermal stability and a low temperature dependence of its physical and optical properties.

By varying the concentration of the di- and multireactive compounds the crosslink density of the polymer film and thereby its physical and chemical properties such as the glass transition temperature, which is also important for the temperature dependence of the optical properties of the optical retardation film, the thermal and mechanical stability or the solvent resistance can be tuned easily.

A preferred polymerisable liquid crystal material comprises
  5-60% of one or more direactive achiral mesogenic compounds,
  20-90% of one or more monoreactive achiral mesogenic compounds,
  0 to 10%, preferably 0.1 to 5% of one or more surfactants,
  0 to 10%, preferably 0.1 to 5% of one or more photoinitiators.

The polymerisable compounds and polymerisable mesogenic compounds referred to above and below are preferably monomers.

The polymerisable mesogenic mono-, di- or multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful mono- and direactive polymerisable mesogenic compounds are shown in the following list of compounds, which should, however, be taken only as illustrative and is in no way intended to restrict, but instead to explain the present invention:

(Ia)

(Ib)

(Ic)

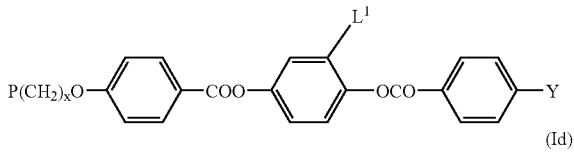

(Id)

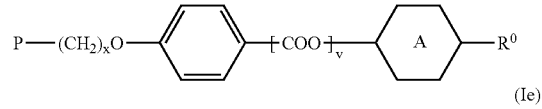

(Ie)

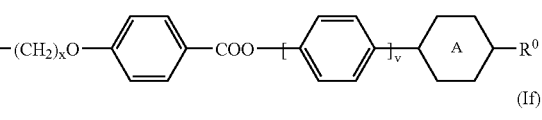

(If)

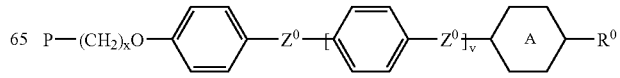

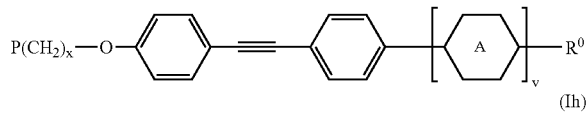

(Ig)

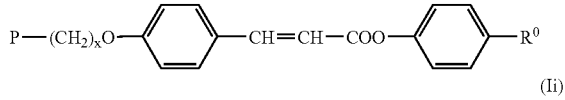

(Ih)

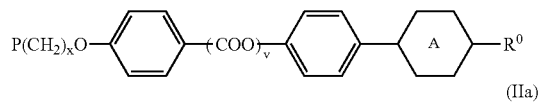

(Ii)

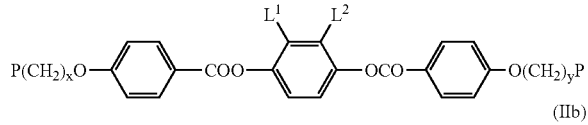

(IIa)

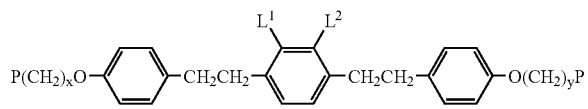

(IIb)

In the above formulae, P is a polymerisable group, preferably an acryl, methacryl, vinyl, vinyloxy, propenyl ether, epoxy or styryl group, x and y are each independently 1 to 12, A is 1,4-phenylene that is optionally mono di or trisubstituted by $L^1$ or 1,4-cyclohexylene, v is 0 or 1, $Z^0$ is —COO—, —OCO—, —CH$_2$CH$_2$—, —C≡C— or a single bond, Y is a polar group, $R^0$ is an non-polar alkyl or alkoxy group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms. The term 'non-polar group' means an alkyl group with 1 or more, preferably 1 to 12 C atoms or an alkoxy group with 2 or more, preferably 2 to 12 C atoms.

Polymerisation of the polymerisable LC material can be achieved for example by exposing it to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerisation is preferably carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable mesogens with acrylate or methacrylate groups, preferably a radical photoinitiator is used, when curing polymerisable mesogens with vinyl and epoxide groups, preferably a cationic photoinitiator is used. It is also possible to use a polymerisation initiator that decomposes when heated to produce free radicals or ions that start the polymerisation. As a photoinitiator for radical polymerisation for example the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used. The polymerisable LC material preferably comprises 0.01 to 10%, very preferably 0.05 to 5%, in particular 0.1 to 3% of a polymerisation initiator. UV photoinitiators are preferred, in particular radicalic UV photoinitiators.

The curing time is dependent, inter alia, on the reactivity of the polymerisable mesogenic material, the thickness of the printed layer, the type of polymerisation initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

The inventive polymerisable liquid crystalline mixtures can additionally comprise one or more other suitable components or additives such as, for example, catalysts, sensitizers, stabilizers, inhibitors, co-reacting monomers, surface-active compounds, lubricating agents, wetting agents, dispersing agents, hydrophobing agents, adhesive agents, flow improvers, defoaming agents, deaerators, inert diluents, reactive diluents, auxiliaries, colourants, dyes or pigments.

Suitable additives are disclosed for example in WO 00/47694, the entire disclosure of which is incorporated into this application by reference.

In particular the addition of stabilizers is preferred in order to prevent undesired spontaneous polymerisation of the polymerisable material for example during storage. As stabilizers in principal all compounds can be used that are known to the skilled in the art for this purpose.

These compounds are commercially available in a broad variety. Typical examples for stabilizers are 4-ethoxyphenol or butylated hydroxytoluene (BHT).

Other additives, like e.g. chain transfer agents, can also be added to the polymerisable LC material in order to modify the physical properties of the resulting polymer film. When adding a chain transfer agent, such as monofunctional thiol compounds like e.g. dodecane thiol or multifunctional thiol compounds like e.g. trimethylpropane tri(3-mercaptopropionate), to the polymerisable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerisable functional groups to the polymerisable LC material alternatively or in addition to the di- or multifunctional polymerisable mesogenic compounds to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerisable groups are trimethylpropanetrimethacrylate or pentaerythritoltetraacrylate.

In another preferred embodiment the mixture of polymerisable material comprises up to 70%, preferably 3 to 50% of a non mesogenic compound with one polymerisable functional group. Typical examples for monofunctional non mesogenic monomers are alkylacrylates or alkylmethacrylates.

It is also possible to add, for example, a quantity of up to 20%/o by weight of a non polymerisable liquid-crystalline compound to adapt the optical properties of the resulting polymer film.

The polymerisation is preferably carried out in the liquid crystal phase of the polymerisable LC material. Therefore, preferably polymerisable mesogenic compounds or mixtures with low melting points and broad liquid crystal phase ranges are used. These types of materials do not require high temperatures over a long period to generate the correct phase and so the use of such materials allows the reduction of the polymerisation temperature, which makes the polymerisation process from a technical point of view easier and is a considerable advantage for mass production. The selection of suitable polymerisation temperatures depends mainly on the clearing point of the polymerisable material and inter alia on the softening point of the substrate. Preferably the polymerisation temperature is at least 30 degrees below the clearing temperature of the polymerisable mesogenic mixture. Polymerisation temperatures below 120° C. are preferred. Especially preferred are temperatures below 90° C., in particular temperatures of 60° C. or less.

The inventive birefringent marking according to this invention can be used in decorative, security, authentification or identification applications, as security, authentification or identification marking, or in a thread or device comprising the birefringent marking.

The birefringent marking can be used in various ways. For example, it is possible to prepare a metallic thread with a polymerised liquid crystal material as described above and then apply this thread to a security document, either as part of a hot stamping foil (HSF) or as a woven thread. According to a further embodiment the liquid crystal material is applied directly to a reflecting area on an existing security document. e.g. overprinting the reflecting area on a banknote.

The birefringent marking can be used for direct application e.g. onto an article, device or document, or as threads, holograms or hot stamping foils for decorative or security applications, to authenticate and prevent counterfeiting of documents of value, for identification of hidden images, informations or patterns. It can be applied to consumer products or household objects, car bodies, foils, packing materials, clothes or woven fabric, incorporated into plastic, or applied as security markings or threads on documents of value like banknotes, credit cards or ID cards, national ID documents, licenses or any product with money value, like stamps, tickets, shares, cheques etc.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

EXAMPLE 1

The following polymerisable mixture is prepared

| | |
|---|---|
| Compound (A) | 12.12% |
| Compound (B) | 29.66% |
| Compound (C) | 22.90% |
| Compound (D) | 28.37% |
| Irgacure 907 | 6.42% |
| Fluorad FC 171 | 0.53% |

(A) $CH_2=CHCOO(CH_2)_6O-\langle\text{Ph}\rangle-COO-\langle\text{Ph}\rangle-OCH_3$ (B) $CH_2=CHCOO(CH_2)_6O-\langle\text{Ph}\rangle-COO-\langle\text{Ph}(CH_3)\rangle-OCO-\langle\text{Ph}\rangle-O(CH_2)_6OCOC=CH_2$ (C) $CH_2=CHCOO(CH_2)_6O-\langle\text{Ph}\rangle-COO-\langle\text{Ph}\rangle-CN$ (D) $CH_2=CHCOO(CH_2)_6O-\langle\text{Ph}\rangle-COO-\langle\text{Ph}\rangle-\langle\text{Cy}\rangle-C_3H_7$ Compounds (A), (B) and (C) can be prepared according to or in analogy to the methods described in D. J. Broer et al., Makromol. Chem. 190, 3201-3215 (1989). Compound (D) and its preparation are described in GB 2,280,445. Irgacure 907 is a commercially available photoinitiator (Ciba Geigy). Fluorad FC 171 is a commercially available surfactant (3M Inc.).

A 30 weight-% solution of the polymerisable mixture in toluene was prepared and filtered through a 1 µm filter. The solution was then placed in the ink chamber of a flexographic printing machine and transferred to an Anilox roller. From this roller the solution was transferred to a polymeric printing plate. The relief of this plate was the mirror image of the design to be printed. The solution was then transferred to from this plate to the metallised side of a black PET film with a thickness of 12 µm which was metallised with aluminium. After evaporation of the toluene with a fan, the film was then passed under a UV lamp which polymerised the liquid crystal material leaving a solid film.

When viewed without a polariser the printed areas are apparent because of the change in surface gloss in the printed areas. When viewed through a linear polariser a deep blue colour is seen at 45° intervals as the polariser is rotated. In between these areas no colour is seen. When viewed through a circular polariser the printed areas show up as light against a black (dark) background. The use of a clear lacquer to overprint the entire printed surface makes the printed areas totally invisible until a polariser is used to view the sample.

EXAMPLE 2

The solution from example 1 was printed as in example 1 but using a paper substrate that had previously been printed with Iriodin® pigments Afflair 201 and Afflair 211 (commercially available from Merck KGaA, Darmstadt, Germany) in a nitrocellulose binder.

When viewed without a polarising device the printed areas are discernible because of their different surface gloss. When viewed through a linear polariser. When viewed through a circular polariser the printed areas become clearly visible against a black background. The use of a lacquer to overprint the entire printed surface makes the printed areas totally invisible until a polariser is used to view the sample.

The invention claimed is:

1. A method of preparing a birefringent marking comprising:
   printing a polymerisable liquid crystal material directly onto at least one surface of a reflective substrate; and
   polymerising the liquid crystal material,
   whereby a birefringent marking is formed on said reflective substrate,
   wherein said polymerizable liquid crystal material is printed onto the reflective substrate by screen printing, offset printing, dry offset printing, reel-to-reel printing, letter press printing, gravure printing, rotogravure printing, flexographic printing, intaglio printing, pad printing, heat-seal printing, ink-jet printing, or printing by means of a stamp or printing plate, and
   printing of said polymerizable liquid crystal material onto the reflective substrate induces or enhances spontaneous alignment of the polymerizable liquid crystal material on said reflective substrate.

2. A method according to claim 1, wherein the liquid crystal material is a nematic or smectic liquid crystal material.

3. A method according to claim 1, wherein the substrate comprises at least one metallic or metallised layer.

4. A method according to claim 3, wherein the metal is selected from aluminium, gold and copper.

5. A method according to claim 1, wherein the substrate comprises at least one layer of reflective pigments.

6. A method according to claim 5, wherein the reflective pigments are selected from interference or pearlescent pigments and liquid crystal pigments.

7. A method according to claim 1, wherein the liquid crystal material comprises at least one compound which induces and/or enhances planar alignment.

8. A method according to claim 7, wherein the compound inducing and/or enhancing a planar alignment is a surfactant.

9. A method according to claim 1, wherein the polymerised liquid crystal material has a splayed structure.

10. A method according to claim 1, wherein the polymerised liquid crystal material has a planar structure.

11. A birefringent marking obtainable by a method according to claim 1.

12. In a method of applying a decorative, security, authentification or identification marking to an item, the improvement wherein said marking is a birefringent marking prepared according to claim 1.

13. A security authentification or identification marking, thread or device comprising at least one birefringent marking prepared according to claim 10.

14. In a document of value, a hot stamping foil, a reflective foil, or an optical data storage device, the improvement wherein said document of value, hot stamping foil, reflective foil, or optical data storage device has at least one birefringent marking according to claim 11.

15. A document of value, a hot stamping foil, a reflective foil, or an optical data storage device comprising at least one security, authentification or identification marking, thread or device according to claim 13.

16. A method according to claim 2, wherein the polymerised liquid crystal material has a planar structure.

17. A security, authentification, or identification marking, thread or device comprising at least one birefringent marking prepared according to claim 16.

18. A method according to claim 1, wherein said birefringent marking is prepared separately on said at least one surface of said reflective substrate; and then said marking and reflective substrate are applied to a document of value.

19. A method according to claim 2, wherein said birefringent marking is prepared separately on said at least one surface of said reflective substrate; and then said marking and reflective substrate are applied to a document of value.

20. A method according to claim 1, wherein said polymerizable liquid crystal material comprises a liquid crystal material and a solvent.

21. A method according to claim 1, wherein said polymerizable liquid crystal material further comprises a polymeric binder or one or more monomers capable of forming a polymeric binder.

22. A method according to claim 1, wherein said polymerizable liquid crystal material does not containing a binder.

23. A method according to claim 8, wherein said surfactant is a fluorocarbon surfactant.

24. A method according to claim 7, wherein the amount of said compound in said polymerizable liquid crystal material 0.01-5 weight %.

25. A method according to claim 24, wherein said fluorocarbons surfactant is of formula I:

$$C_nF_{2n+1}SO_2N(C_2H_5)(CH_2CH_2O)_xCH_3 \qquad I$$

wherein
n is an integer from 4 to 12, and
x is an integer from 5 to 15.

26. A method according to claim 1, wherein said birefringent marking has a birefringence in the range from 0.1 to 0.3 and a thickness from 0.5 to 20 μm.

27. A method according to claim 1, wherein said birefringent marking further comprises one or more further layers applied onto said birefringent marking.

28. A method according to claim 27, wherein said one or more further layers are selected from a protecting layer, a support layer, an adhesive layer, a reflecting layer, an optical retardation layer, a color filter, a polarizer, or combinations thereof.

29. A method according to claim 2, wherein said polymerizable liquid crystal material further comprises a surfactant, said polymerizable liquid crystal material is printed onto discrete regions of said reflective substrate, and said reflective substrate is a metallized or metal substrate.

30. A method according to claim 29, wherein said liquid crystal material is a nematic liquid crystal material.

31. A method according to claim 2, wherein said polymerizable liquid crystal material further comprises a surfactant, said polymerizable liquid crystal material is printed onto discrete regions of a paper substrate that is covered by a layer of interference pigments dispersed in a transparent binder.

32. A method according to claim 31, wherein said liquid crystal material is a nematic liquid crystal material.

33. A method according to claim 1, wherein said birefringent marking is invisible under unpolarized light and is visible when viewed through a polariser.

* * * * *